(12) United States Patent
Knighton

(10) Patent No.: US 8,194,040 B2
(45) Date of Patent: Jun. 5, 2012

(54) COMPACT TOUCH-TYPE KEYBOARD

(75) Inventor: Mark S. Knighton, Santa Monica, CA (US)

(73) Assignee: Synerdyne, Santa Monica, CA (US)

( * ) Notice: Subject to any disclaimer, the term of this patent is extended or adjusted under 35 U.S.C. 154(b) by 1149 days.

(21) Appl. No.: 12/014,493

(22) Filed: Jan. 15, 2008

(65) Prior Publication Data

US 2008/0129697 A1    Jun. 5, 2008

Related U.S. Application Data

(62) Division of application No. 10/437,017, filed on May 8, 2003, now abandoned.

(51) Int. Cl.
G06F 3/02    (2006.01)
B41J 5/28    (2006.01)
B41J 3/39    (2006.01)

(52) U.S. Cl. ............................ 345/169; 400/485; 400/88

(58) Field of Classification Search .......... 345/168–172; 400/82, 88, 485

See application file for complete search history.

(56) References Cited

U.S. PATENT DOCUMENTS

| | | | |
|---|---|---|---|
| 1,652,464 A | 12/1927 | Tyberg | |
| 2,532,228 A * | 11/1950 | Hesh | 400/485 |
| 3,399,287 A | 8/1968 | Euler | |
| 3,633,724 A * | 1/1972 | Samuel | 400/485 |
| 4,201,489 A | 5/1980 | Zapp | |
| 4,256,931 A | 3/1981 | Palisek | |
| 4,440,515 A | 4/1984 | Nassimbene | |
| 4,449,839 A * | 5/1984 | Bleuer | 400/485 |
| 4,536,625 A | 8/1985 | Bebie | |
| 4,584,443 A * | 4/1986 | Yaeger | 200/6 A |
| 4,654,647 A | 3/1987 | Wedam | |
| 4,719,455 A | 1/1988 | Louis | |
| 4,761,522 A * | 8/1988 | Allen | 200/5 R |
| 4,778,295 A | 10/1988 | Bleuer | |
| 4,896,003 A | 1/1990 | Hsieh | |
| 4,913,573 A * | 4/1990 | Retter | 400/489 |
| 4,935,728 A | 6/1990 | Kley | |
| 5,012,230 A | 4/1991 | Yasuda | |
| 5,017,030 A * | 5/1991 | Crews | 400/485 |
| 5,086,296 A | 2/1992 | Clark | |
| 5,087,910 A | 2/1992 | Guyot-Sionnest | |
| 5,252,952 A | 10/1993 | Frank et al. | |
| 5,383,735 A | 1/1995 | Smiley | |
| 5,424,728 A * | 6/1995 | Goldstein | 341/22 |
| 5,497,151 A | 3/1996 | Dombroski | |
| 5,504,502 A | 4/1996 | Arita et al. | |

(Continued)

FOREIGN PATENT DOCUMENTS

EP    1223501 A1    7/2002

(Continued)

*Primary Examiner* — Bipin Shalwala
*Assistant Examiner* — Steven Holton
(74) *Attorney, Agent, or Firm* — Blakely, Sokoloff, Taylor & Zafman LLP

(57) ABSTRACT

A floating button that may be used to replace a plurality of distinct buttons and/or a graphical pointing device. The floating button translates in a region defined by a housing. A sensor detects the location of the button in the region. The locations within the region may be mapped to a plurality of virtual buttons. This permits a button of a size appropriate for comfortable operation by a finger, while allowing the selection of a large number of functions in a space that is only somewhat larger than a single button. The location of the button within its translation region also provides an immediate tactile and visual reference as to the function to be selected.

7 Claims, 7 Drawing Sheets

U.S. PATENT DOCUMENTS

| | | | |
|---|---|---|---|
| 5,528,235 A | 6/1996 | Lin et al. | |
| 5,564,560 A | 10/1996 | Minelli | |
| 5,661,505 A | 8/1997 | Livits | |
| 5,666,138 A | 9/1997 | Culver | |
| 5,790,108 A | 8/1998 | Salcudean et al. | |
| 5,808,603 A | 9/1998 | Chen | |
| 5,841,374 A * | 11/1998 | Abraham | 341/34 |
| 5,841,635 A * | 11/1998 | Sadler et al. | 361/749 |
| 6,031,469 A | 2/2000 | Dodd | |
| 6,075,522 A | 6/2000 | Milroy | |
| 6,103,979 A * | 8/2000 | Motoyama et al. | 200/4 |
| 6,157,323 A | 12/2000 | Tso et al. | |
| 6,168,331 B1 * | 1/2001 | Vann | 400/472 |
| 6,230,222 B1 | 5/2001 | Rush | |
| 6,307,537 B1 | 10/2001 | Oowada | |
| 6,348,878 B1 | 2/2002 | Tsubai | |
| 6,386,773 B1 | 5/2002 | Mathias | |
| 6,417,838 B1 | 7/2002 | Inamura | |
| 6,437,682 B1 | 8/2002 | Vance | |
| 6,520,699 B2 | 2/2003 | Abe | |
| D473,226 S | 4/2003 | Griffin | |
| 6,594,142 B2 * | 7/2003 | Katz | 361/679.16 |
| 6,869,239 B2 * | 3/2005 | Morris | 400/488 |
| 7,202,853 B2 * | 4/2007 | Ng et al. | 345/168 |
| 2001/0006587 A1 | 7/2001 | Keinonen et al. | |
| 2002/0149566 A1 * | 10/2002 | Sarkissian | 345/168 |
| 2003/0193478 A1 | 10/2003 | Ng et al. | |
| 2004/0190968 A1 | 9/2004 | Yang | |
| 2005/0123333 A1 | 6/2005 | Sugimura et al. | |

FOREIGN PATENT DOCUMENTS

| | | |
|---|---|---|
| WO | WO 02/39701 A2 | 5/2002 |
| WO | WO-02101531 | 12/2002 |
| WO | WO 03/007143 A1 | 1/2003 |

* cited by examiner

COMPACT TOUCH-TYPE KEYBOARD

BACKGROUND

This patent application is a divisional of application Ser. No. 10/437,017, filed on May 8, 2003 and entitled A MULTIFUNCTION FLOATING BUTTON.

1. Field of the Invention

The embodiments of the invention relate to a button to provide selection between a plurality of options. More specifically, the embodiments relate to one button that can replace a plurality of individual buttons.

2. Background

Cursor control devices have been the ubiquitous for many years. Both the Macintosh® and Windows® operating systems provide for drag and drop using a mouse, trackball or similar cursor control device. Such devices also permit selection of a plurality of, for example, screen icons, by moving the cursor to overlap the icon. These devices tend to be relatively mapped. "Relatively mapped" means that wherever the cursor is, movement of the control device, e.g., trackball, will move the cursor in the direction the control device moves. However, the position of the control device gives no indication of where on the display the cursor might be found. Advances in mouse technology have largely been in the area of improved responsiveness of the cursor to movement of the mouse. For example, early mice relied on a physically moveable ball protruding from the bottom side of the device. Those mice tended to become dirty and then become increasingly less reliable in moving the cursor in response to any movement of the mouse. For laptops, and other handheld devices, small joysticks such as used on the IBM Thinkpad® or touchpads as are commonly found on Macintosh® Powerbooks, proliferated to avoid the inconvenience of having to carry and use the separate mouse in the mobile environment. Common to these cursor control devices is that they are relatively mapped. Additionally, with respect to the touchpad over time, dragging one's finger across the touchpad can reduce sensitivity on both the touchpad and the user's finger.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

FIG. 9 is a bottom rear perspective view of an embodiment of the invention.

FIG. 10b is the mapping for the J key corresponding to button 1010 in FIG. 10a.

DETAILED DESCRIPTION OF THE INVENTION

Figure 1:
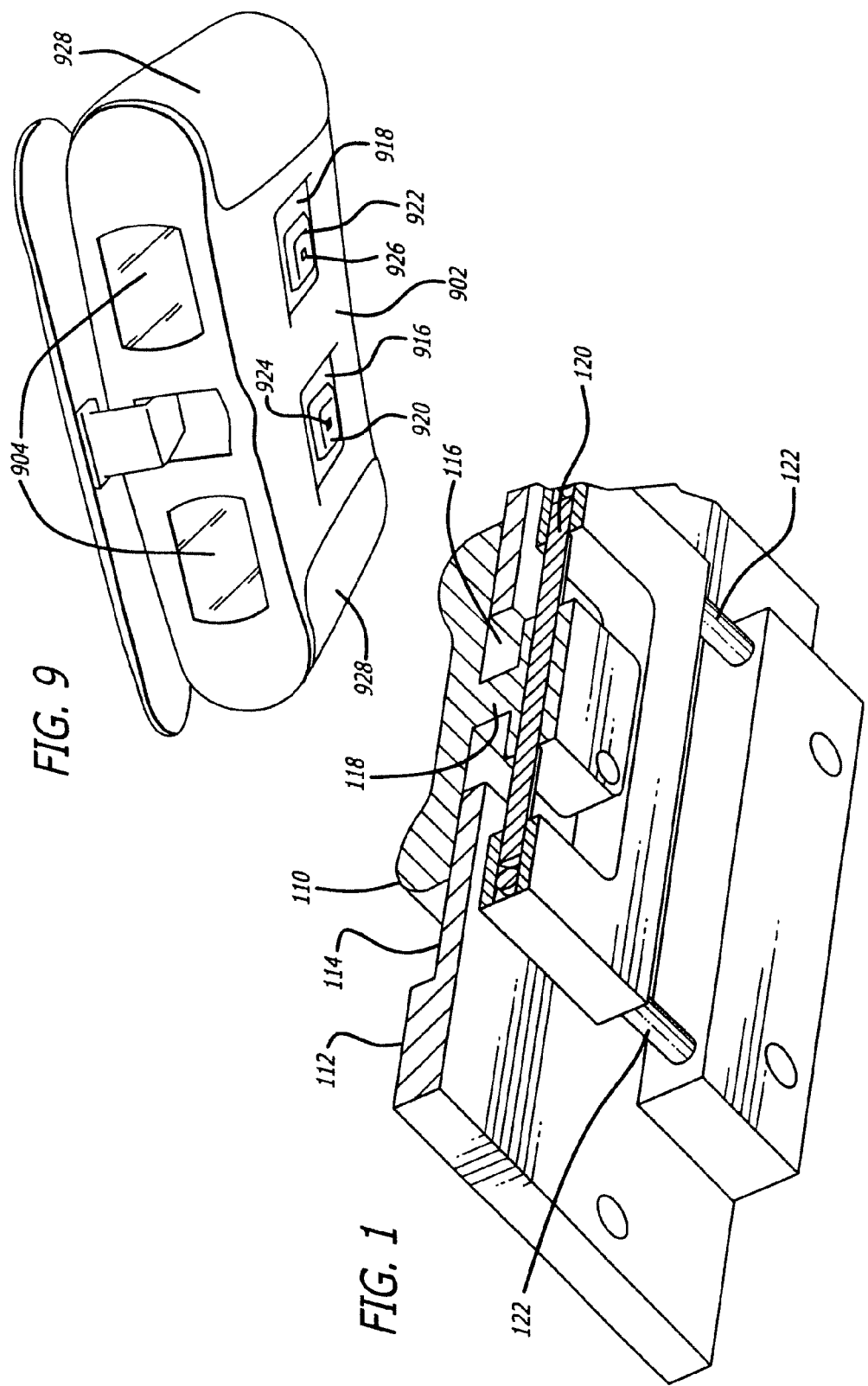
FIG. 1 is a partial sectional view of a floating button of one embodiment of the invention.

FIG. 1 is a partial sectional view of a floating button of one embodiment of the invention. A housing 112 defines a region 114 in which button 110 may translate. In one embodiment, button 110 is selected to have a size and shape suitable for engagement by a finger of a user. As used herein, "finger" is deemed to include the digits or a human hand including the thumb. Thus, the button 110 may be large enough to accommodate a user's thumb.

Region 114 defines an opening 116 there through. In one embodiment, button 110 is coupled through the opening 116 to a transport mechanism including a first linear bearing 120 and a second linear bearing 122 which is orthogonal to the first bearing 120. The button 110 is coupled to translate along the first linear bearing 120 responsive to a force component parallel to the first bearing 120. The button 110 and first bearing 120 in turn are mounted on the second linear bearing 122 which in one embodiment includes a pair or rods. The combination of the button and the first linear bearing translate along the second linear bearing 122 responsive to the force component parallel to the axis of second linear bearing 122. In this manner, button 110 is free to translate in two orthogonal directions within the region 114 defined by housing 112.

The translation is typically substantially planar following a surface defined by the housing 112. The button 110 and any structures fixed thereto translate relative to the housing. This is distinct from control devices that have one end fixed in relation to their housing such that the fixed end can only pivot rather than translate. Substantially, planar is deemed to include large radius arcs that may be desirable for aesthetic or ergonomic purposes. There is no requirement that the button 110 maintains contact with the housing within the translation region. In some embodiments, the button 110 is elevated slightly (or even substantially) off the housing 112 within the region 114 and translates on a surface substantially parallel to, though elevated from the housing 112. Such embodiments reduce or eliminate friction between the housing 112 and button 110. Constraints to the translation may be imposed by a physical barrier, e.g., a rim surrounding the region or by the dimensions of the opening. When the range of motion is defined by the opening, no physical constraint on the button is required permitting a frameless design for the button (see e.g., FIGS. 7 and 8 below). In one embodiment, the dimension of the opening is chosen consistent with a size and shape of the button such that the opening is not exposed even when the button is at the limit of its translation range. For example, a half inch square opening can certainly be covered by an inch and a half square button. While this 3 to 1 ratio works, other ratios are also suitable. Insuring the opening is always covered reduces the risk of debris contaminating or fouling the internal electrical or mechanical components. It is also possible to provide environmental resistance with a separate sliding cover element or flexible cover within the coupling mechanism, thereby allowing larger translation with a given button size without exposing the opening. By coupling a sensor such as an electromagnetic or optical pair (described below) to the button and housing, a location of the button 110 within the region 114 may be determined to a desired resolution. In one embodiment, the region 114 is provided with a textured surface. As used herein, a "textured surface" includes one or more of grooves, bumps, detents or any other surface feature that passively provides a tactile experience to the user when the button 110 passes over it.

Figure 2:
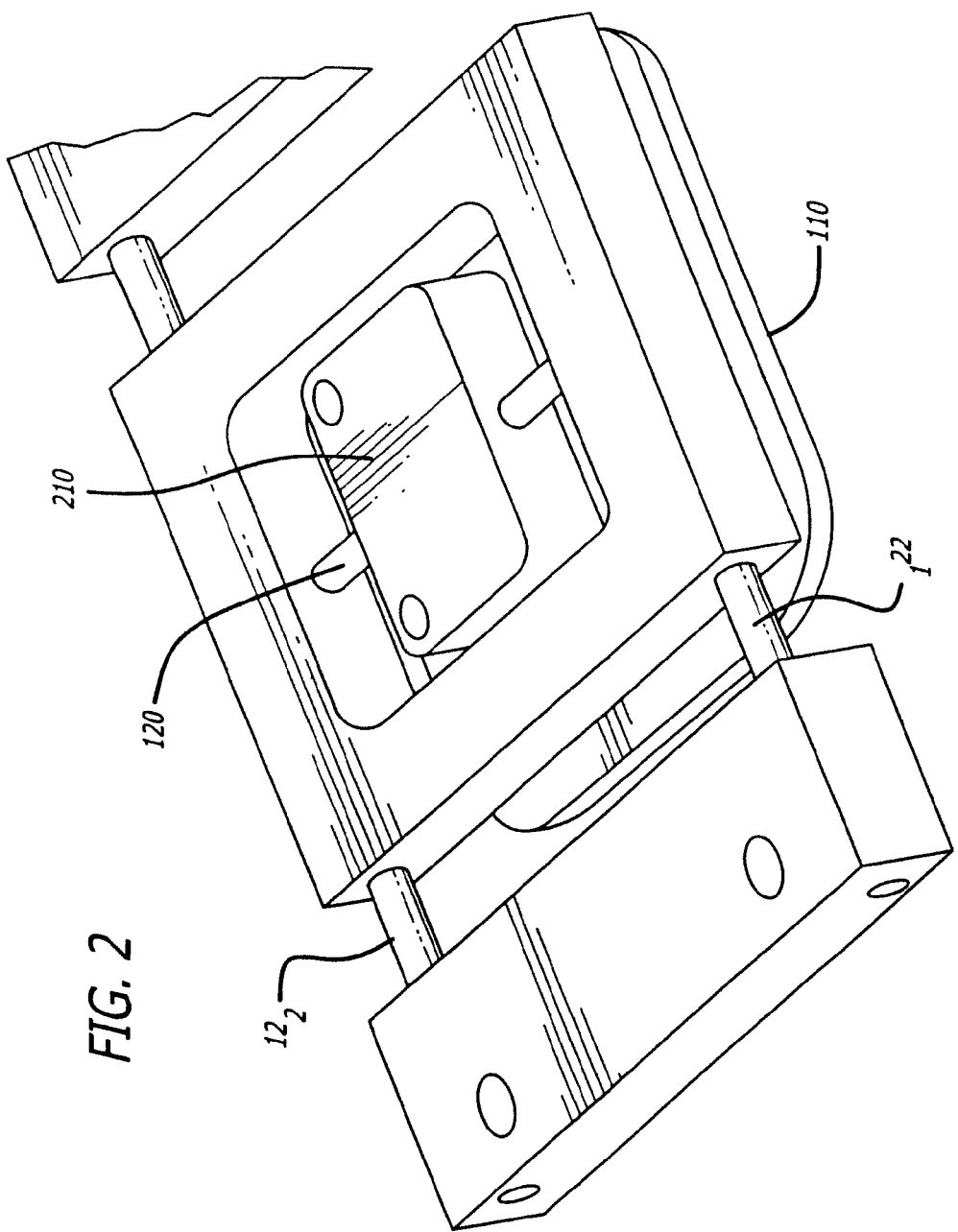
FIG. 2 is a partial bottom perspective view of a floating button of one embodiment of the invention removed from the housing.

FIG. 2 is a partial bottom perspective view of a floating button of one embodiment of the invention removed from the housing. Surface 210 of retention mechanism 118 is concentric (though displaced in a direction normal to the plane of translation) with button 110. As such, a surface 210 provides a suitable mounting location for one component, e.g., an emitter, detector, or target of a sensor to identify the location of the button within the translation region.

Figure 3:
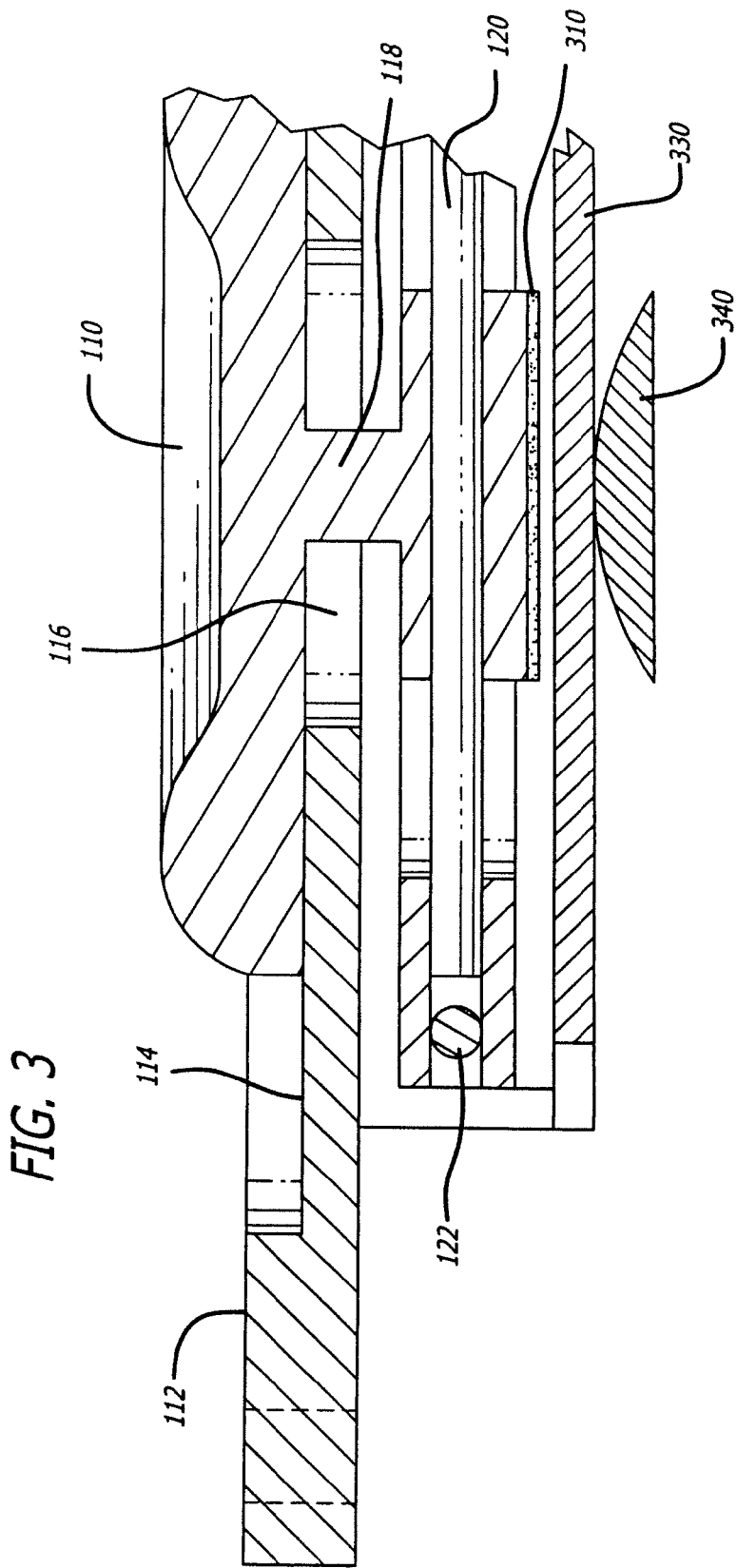
FIG. 3 is a partial sectional view of floating button assembly of one embodiment of the invention.

FIG. 3 is a partial sectional view of floating button assembly of one embodiment of the invention. The button 110 is free to translate throughout the region 114 defined by housing 112. Button 110 is coupled to a first linear bearing 120 and the button 110 and first linear bearing 120 are coupled to the second linear bearing 122. A sensor portion 310 is disposed on an internal surface of retention member 118 so that that sensor portion 310 translates with the button 110. A second sensor portion 330 is disposed in a desired relation to sensor portion 310 to permit the sensor as a whole to discern the location of the button 110 within region 114 to a desired level of granularity.

In one embodiment, an additional sensor 340 is provided to detect a selection input from the button 110. In one embodiment, a sensor 340 is a click dome and the button and/or additional portions of the button assembly are permitted limited motion in a direction substantially perpendicular to the translation region 114 to actuate the click dome and effect a selection. This permits the single button to be used to replace multiple buttons or keys by allowing the selection of a plurality of different functions with a single press of the button at different locations. As used herein, selection of a different alpha numeric character is deemed a separate function. In one embodiment, the button and bearing assemblies are cantilevered over the sensor 340 to permit actuation by pressure in the Z direction (first linear bearing is the X direction and the second linear bearing is the Y direction). In one embodiment, sensor element 310 is an electromagnetic (EM) emitter and sensor element 330 is an electromagnetic detector. As used herein, EM is deemed to include both electric and magnetic fields. The electric and magnetic fields or the electric and magnetic components are permitted to have any magnitude including zero. Thus, a purely electric field or a purely magnetic field is still deemed to be an EM field as the term is used herein.

In one embodiment, sensor portion 310 may be part of a capacitor and element 330 forms a second part of the capacitor, e.g., parallel plates. In another embodiment, element 310 may be part of an inductor and element 330 forms another part of the inductor. In another embodiment, element 310 may be a probe in surface contact with a resistive pad. A distance between elements 310 and 330 may be selected based on the characteristics of a particular EM system employed. For example, as noted above, while there would certainly be a finite distance between the two capacitor plates (which could be defined by a layer of dielectric material) contact may be required for the resistive detection.

In an alternative embodiment, sensor portions 310 and 330 form an optical sensor. In such an embodiment, portion 310 may, for example, be a light source, such as a light emitting diode (LED) and sensor portion 330 may be a plurality of photo detectors. Alternatively, portion 310 may, for example, be a target pattern while sensor portion 330 includes an imaging array and a light source such that imaging of the target permits derivation of the location of the button 110 within the region 114. Some of these embodiments are described further below in connection with FIGS. 4*a-e*.

Figure 4A:
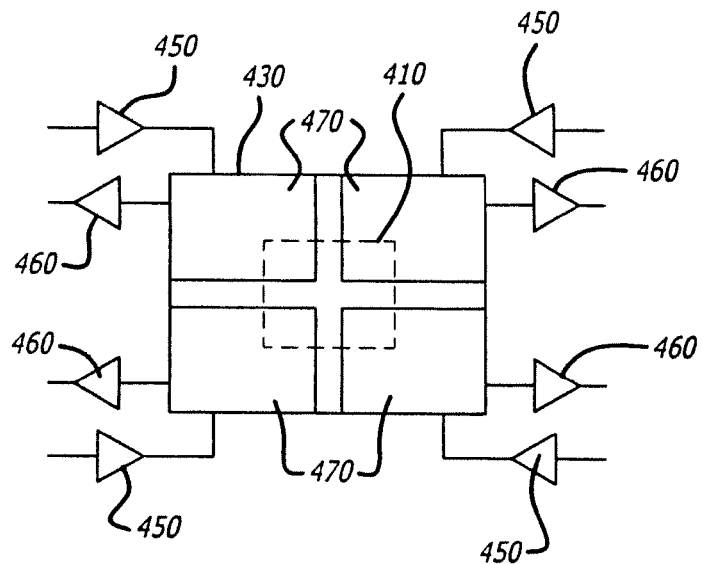
FIG. 4a is a schematic diagram of a sensor of one embodiment of the invention.

FIG. 4*a* is a schematic diagram of a sensor of one embodiment of the invention. In the shown embodiment, a plurality of amplifiers 450 supply voltage to capacitive plates 470 of sensor portion 430. In this embodiment, a passive plate having footprint 410 is coupled to and moveable with the floating button and preferably concentric therewith. Concentricity is not necessary, it merely changes the transformation required to determine the position within the translation region. A plurality of amplifiers 460 supply an indication of the electric field and therefore the capacitance between the various plates 470 and the passive plate having footprint 410. Since capacitance is proportional to the area of overlap, a ratio of this capacitance with respect to each of the four fixed plates, uniquely determines the location of the moving plate with footprint 410. Since the footprint has a known relation to the floating button, this necessarily also gives the location of the button within the region. An origin can be defined as, for example, when the passive plate is centered over the four active plates such that the capacitance of each plate is the same. The location of the button within the region can then be determined relative to this origin. While this is a possible origin, the origin can be substantially arbitrarily defined with the change in capacitance indicating relative motion from the origin. This idea of relative motion to a defined origin is common to the EM and optical sensors described below. In an alternative embodiment, the moveable plate may be connected to a power source such as amplifier 450. Amplifiers 450 and 460 provide a signal and permit readout under the control, for example, a microcontroller. It is also within the scope and contemplation of the invention for the four plates to be coupled to the button moveable therewith with a single plate underlying. Thus, the portion of the electromagnetic pair coupled with a sensor may be either half of the pair.

Figure 4B:
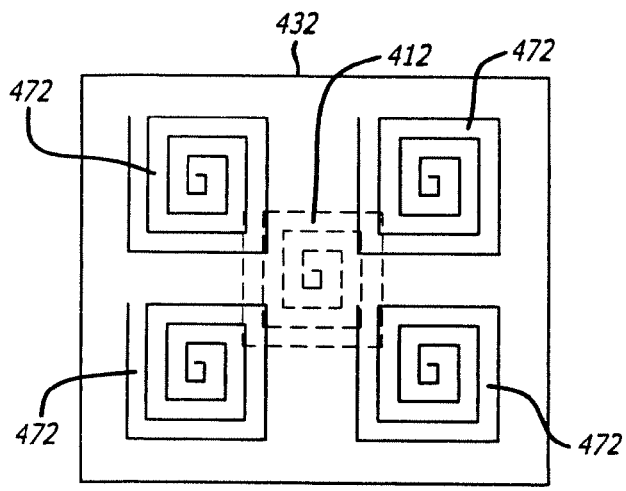
FIG. 4b is a schematic diagram of a portion of a sensor of one embodiment of the invention.

FIG. 4*b* is a schematic diagram of a portion of a sensor of one embodiment of the invention. In this embodiment, a plurality of inductive elements 472 are placed in relation to an inductive element having a footprint 412 coupled and moveable with the pointer button. Again, the ratio of inductance between the plural inductive elements 472 and the inductive element having footprint 412 provides a unique location of the button within the region. Also, similarly, sensor portion 432 could be coupled to the button moveable therewith while the inductive element having footprint 412 is retained in a fixed location in the housing.

Figure 4C:
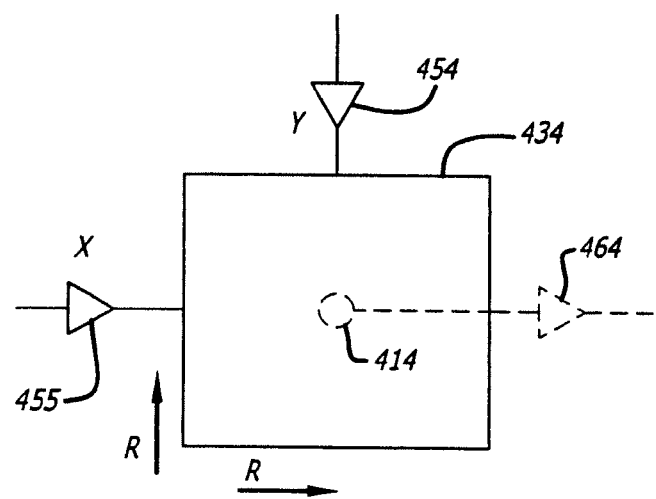
FIG. 4c is a schematic diagram of a portion of the sensor of an alternative embodiment of the invention.

FIG. 4*c* is a schematic diagram of a portion of the sensor of an alternative embodiment of the invention. A resistive pad 434 with a resistance that varies in the X and Y direction has as a power source 435 to apply a voltage in an X direction and a power source 454 to apply a voltage in a Y direction. By testing the voltage at a probe 414 in contact with the surface, a location of the probe in the variable resistance pad 434 may be determined. Because the probe is maintained in a known location relative to the floating button, the location of the button may then be discerned from the voltage at the probe. In one embodiment, a non-contact probe employs capacitive coupling to measure the voltage on the resistive pad.

Figure 4D:
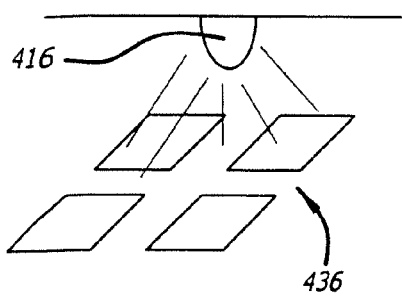
FIGS. 4d and 4e are alternative optical sensors of one embodiment of the invention.
Figure 4E:
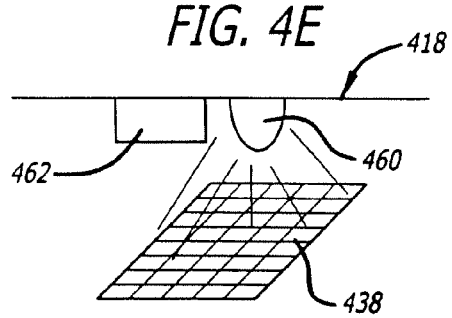

FIGS. 4*d* and 4*e* are alternative optical sensors of one embodiment of the invention. In FIG. 4*d*, a light source 416 is disposed to illuminate photo sensing elements 436. A ratio of intensities at the various photo sensitive elements 436 provides a unique indication of the location of the button within the region. Alternatively, the light source may be fixed to the housing and the photo sensing elements may move with the button. In the embodiment of FIG. 4e, a light source 460 and a photo detective element such as a phototransistor may be mounted to move with the floating button. A target pattern 438 is fixed relative to the housing to permit illumination by the light source 460 and imaging by the photo detective element 462 to permit determination of location of the button within the region. Again, the attachment of the target could be to the button while the imager and light source are retained in fixed relation to the housing. All such embodiments are contemplated and within the scope of the invention.

Figure 5A:
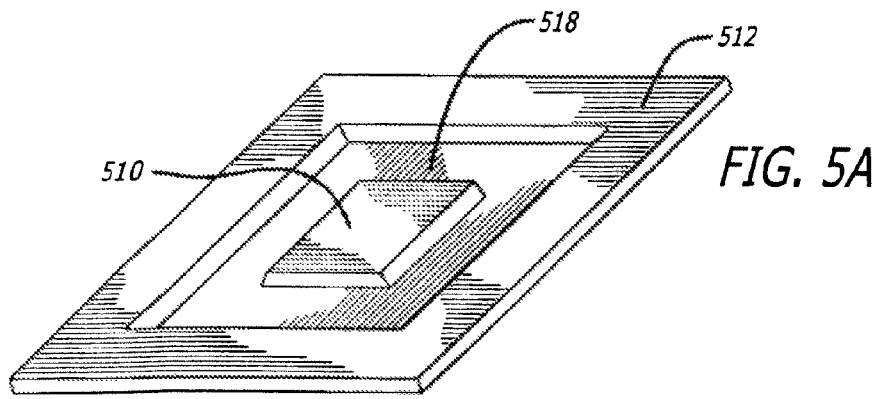
FIGS. 5a and 5b are schematic diagrams of an alternative configuration of the floating button.
Figure 5B:
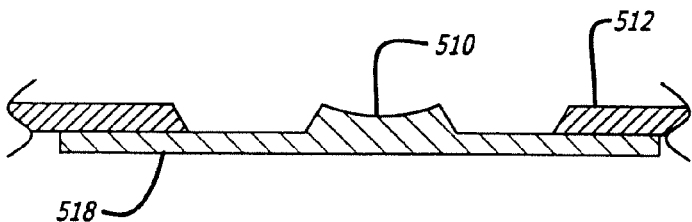

FIGS. 5a and 5b are schematic diagrams of an alternative configuration of the floating button. In this embodiment, the housing 512 defines a region for movement of the floating button 510 as an opening in the housing such that the edges of the opening are the constraint on the movement of the button 510. An integrally formed flange 518 is captured by the housing. The flange 518 insures that the button 510 can translate throughout the region without exposing an edge of the flange 518, e.g., no gaps exist between the edges of the flange and the housing when the button is at the extremes of its translation region. Other aspects as described above in connection with other embodiments may be employed with this button formation.

Figure 6:
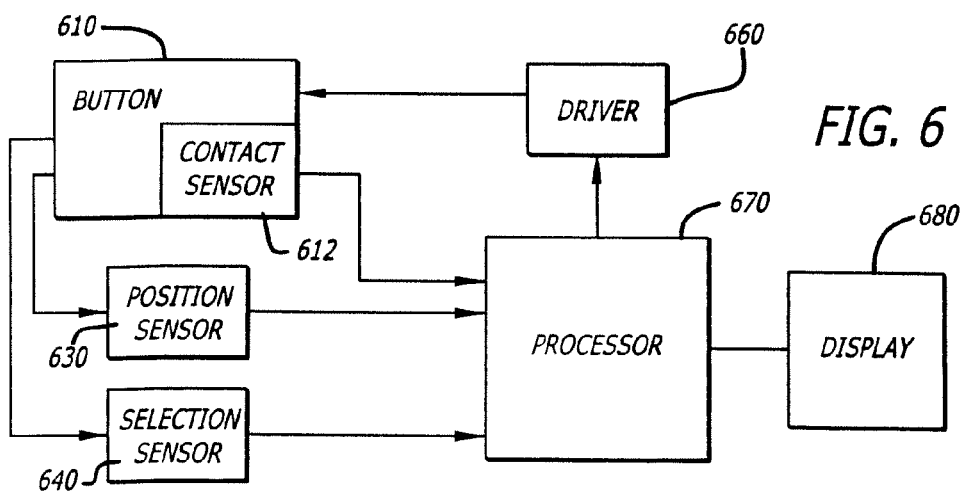
FIG. 6 is a block diagram with button and control system of one embodiment of the invention.

FIG. 6 is a block diagram with button and control system of one embodiment of the invention. Button 610 may include a contact sensor 612. Contact sensor 612 may be, for example, a biometric detector responding to, e.g., galvanic skin response, a photo detector responding to the absence of light, a pressure sensor responding to contact between the user's finger and the button, or a "break switch" which breaks contact when the button is pushed away from its rest position, or any other suitable sensor that permits detection of a user's finger. In an alternative embodiment, contact sensor 612 may be external to the button. Contact sensor 612 may provide a signal to the processor which in one embodiment may signal the processor to awaken from a lower power mode and power up the overall system.

Processor 670 may be any of the myriad microcontrollers suitable for consumer electronic products, a microprocessor, an application specific integrated circuit (ASIC) or merely logic sufficient to affect the control functions required in the context of the application. Position sensor 630 is coupled in communication with the button 610 to identify the position of the button 610 within its region of possible translation. Position sensor 630 provides this information to the processor 670 which may take appropriate action based on the information provided. For example, the power 670 may cause the cursor to move or the display 680 responsive to the location within the translation region. This is particularly true for those embodiments in which the region is absolutely mapped to the display 680.

Position sensor 630 may be any of the embodiments previously described or for relatively low granularity systems, it may be merely a switch array. A switch array is suitable for providing access to a plurality of possible selectable options, but the granularity is necessarily less than in the context of some of the electromagnetic and optical embodiments described in connection with FIGS. 4a through 4e. One embodiment in which a switch array may be suitable is where the only selection is, e.g., the twelve keys on a standard telephone keypad. Thus, a switch array may be suitable for some television remote control, security code keypads, telephone, etc.

Selection sensor 640 provides the mechanism for a selection input responsive to pressure or perpendicular movement of the button 610. Thus, selection sensor 640 may be a click dome, conductive rubber dome, a pressure sensor, a capacitive switch, rocker switch or other suitable detector for indicating this selection has occurred. In the case of a rocker switch, a small switch might be disposed in the button to permit actuation responsive to an orientation change of the controlling finger. Other suitable sensors for identifying a selection input will occur to those of ordinary skill in the art. Selection input provides a signal to the processor 670 which correlates the position derived from the position sensor with a selection input to identify which of the plural options have been selected. In one embodiment, the processor is connected to a driver 660 which in turn is coupled to the button 610. The driver 660 may provide force feedback along one or more axes of motion of the button or other tactile indication, such as vibration. This either indicates the button's position within the translation region, or a feature of in the virtual environment provided by the display 680 as it relates to the position of the cursor as defined by the button's position. In some embodiments, the driver 660 may be a motor, a servo, a galvo or other suitable mechanical drive to apply the desired force on the button 610. Some embodiments of the invention will have a display 680 with the translation region may be absolutely mapped to at least a portion of the display. As used herein, "absolutely mapped" means that the physical location of the button within its translation region is correlated with a particular location on the display. Location on the display may represent a single pixel or a plurality of contiguous pixels depending on the granularity of the sensor 630 associated with detecting the location of the button 610. In some embodiments, the region in which the button 610 is permitted to translate will have a shape and orientation consistent with the display 680 to which it is absolutely mapped. Thus, for example, if the display has a 3×4 aspect ratio, the translation region may have a 3×4 aspect ratio. The button 610 may be mapped to all or only a portion of the display. It is also contemplated that multiple floating buttons may be used in a single device. In such embodiments, mapping to the display may be partitioned amongst the buttons. In some embodiments, mapping and remapping may occur responsive to detection of contact with the button. It is also contemplated that there will be systems in which the button 610 is purely a selection mechanism unassociated with the display such as the security key pad mentioned above.

Figure 7:
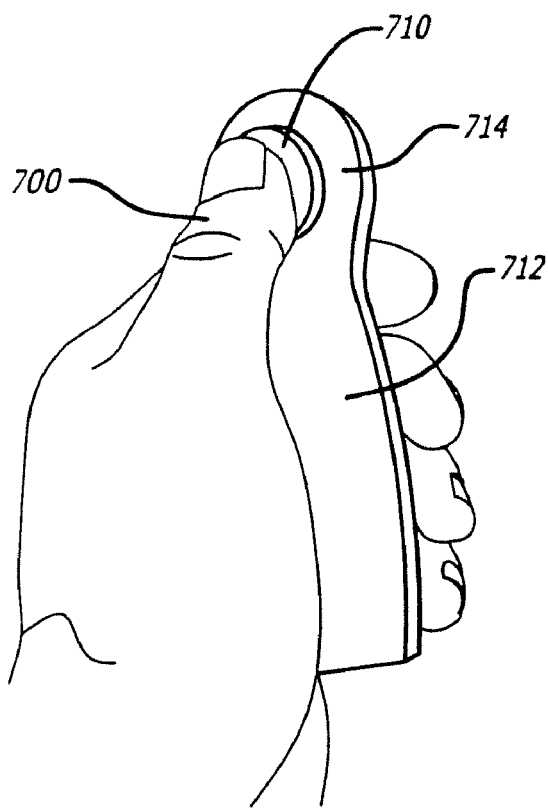
FIG. 7 is a perspective environmental view of a device having a floating button in one embodiment of the invention.

FIG. 7 is a perspective environmental view of a device having a floating button of one embodiment of the invention. This embodiment is suitable for a remote control such as for a television or computer. In one embodiment, it may wirelessly signal an associated display device to cause a function to be selected. In one embodiment, motion of the button may control a cursor on a remote display device. Either infrared or radio frequency signaling protocols could be used. A housing 712 defines a region 714 in which a floating button 710 may translate. In this view, the user's finger 700 is shown engaging the floating button 710. In this embodiment, no physical constraint, e.g., rim or physical barrier, exists around the perimeter of the button to define region 714. Rather, the button is constrained within the region by the dimensions of the opening (not shown) through which it is coupled to its transport mechanism within the housing 712. By appropriately defining the opening, the translation of the button 710 can be constrained so that it does not extend beyond the edges of the housing 712. It is of course within the scope and contemplation of the invention to constrain the motion of the button 710 so it does not reach the edges or in some embodiments the button 710 may be permitted to extend beyond the edges of the housing 712.

Figure 8:
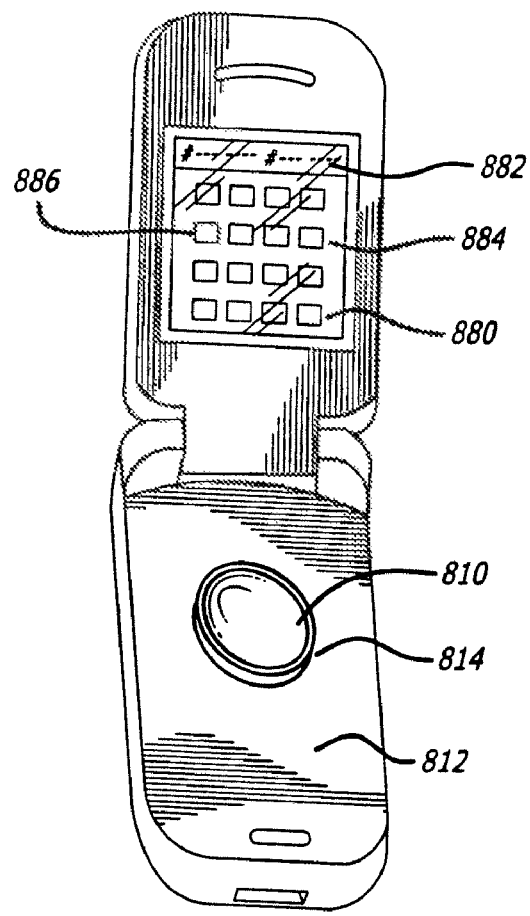
FIG. 8 is a perspective view an embodiment of the invention used in connection with a cellular telephone.

FIG. 8 is a perspective view of an embodiment of the invention used in connection with a handheld communicator. In one embodiment, housing 812 defines a region 814 over which the floating button 810 can translate in two orthogonal directions. The position of the button may be absolutely mapped to all of display 880 or only a portion thereof. For example, display region 884 may be the absolutely mapped portion of the display and display region 882 may be inaccessible with the button. Various selectable options 886, which may correspond to a telephone keypad or other more advanced functions, may reside within absolutely mapped region 884 to be selectable by the pointer button. For example, assuming the selection option 886 includes a telephone keypad, the user could select the numbers which would then appear in unmapped region 882 awaiting a send command. In another embodiment, a floating button 810 may be used to select functions without any mapping or association with the phone display. Force feedback and/or passive tactile indicators may facilitate user selection without the need to look at the display. The selected function may then cause the display to change commensurate with that function.

FIG. 9 is a bottom rear perspective view of an embodiment of the invention. A digital camera with a binocular display resides within a compact housing 902. The housing defines a pair of lobe handgrips 928. These handgrips 928 may be coated within an elastomeric material to provide improved grip and holding comfort for a user. The housing 902 defines openings in which a pair of binocular lenses 904 may be disposed. The lenses 904 are in the optical path of a pair of megapixel displays, which also serve as a viewfinder. As such, a user looking through the lenses is provided a high-resolution binocular view of what the camera lens currently sees. Additionally, details of such a manner can be formed in copending application entitled, DISPLAY, INPUT AND FORM FACTOR FOR PORTABLE INSTRUMENTS, Ser. No. 09/990,831, filed Nov. 9, 2001.

In one embodiment, a left and a right hand floating button 920 and 922, respectively, provide pointer functionality on the display. Each floating button may reside in a region 916, 918, which is absolutely mapped to at least a portion of the display. In one embodiment, the regions are mapped to, for example, the right and left-hand side of the display and do not overlap. Alternatively, each region could be mapped to the entire display or have some overlap, e.g. each mapped to two-thirds of the display. Typically, the regions 916, 918 will be shaped and oriented similarly to the area of the display to which they map. Each floating button 920, 922 is moveable in two orthogonal directions within its respective region. The floating button may be actuated by pressing the pad substantially perpendicular to the two orthogonal directions of movement. For example, if the floating button moves in an x-y plane, actuation occurs when the pad is pressed in a z direction. Additionally, each floating button may be provided with a sensor 924, 926 to indicate when a user is engaging the respective floating button. Such sensors may include biometric sensors, e.g., to detect galvanic skin response, pressure sensors, temperature sensors, or a "break switch" which breaks contact when the button is pushed away from its rest position, or any other sensors which would give a reasonable indication that a user is engaging the floating button 920, 922. In one embodiment, when both floating buttons are engaged, each floating button is mapped to half the display, but if only one floating button is engages, the floating button is remapped to the entire display.

Various devices that may employ the floating button of various embodiments of the invention are illustrated and described above. Additional examples include, notebook, laptop, and handheld computers, personal digital assistants (PDA's) or any other device where size constraints would make desirable the use of a single button to replace many buttons.

Figure 10A:
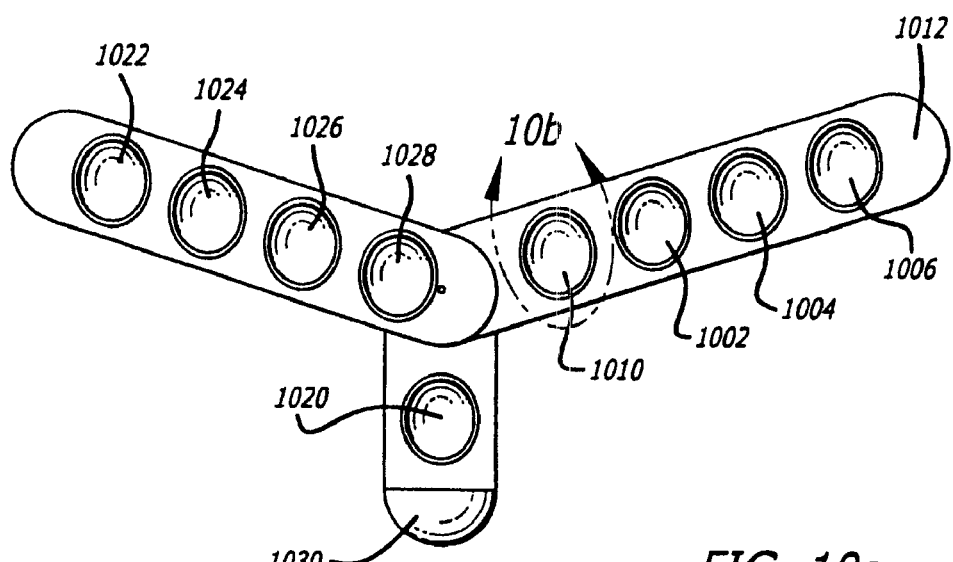
FIG. 10a is a diagram of a compact touch type keyboard.

FIG. 10a is a diagram of a compact touch type keyboard. A housing 1012 is coupled to a plurality of floating buttons 1010, 1002, 1004, 1006, 1022, 1024, 1026, 1028 and 1020. Button 1020 may correspond to a mouse or a pointing device that may be mapped relatively or absolutely to a display (not shown). The remaining buttons may be mapped to functions of a typewriter keyboard. In one embodiment, button 1022 maps to letter A and the functions on a QWERTY keyboard to be actuated by the little finger of the left hand of a user. Button 1024 maps to S and the other functions controlled by the left ring finger. Button 1026 maps to D and the other functions controlled by the left middle finger. Button 1028 maps to F and the other functions controlled by the left index finger. Button 1010 maps to J and the other functions controlled by the right index finger. Button 1002 maps to K and the other functions controlled by the right middle finger. Button 1004 maps to L and the other functions controlled by the right ring finger. Button 1006 corresponds to the semicolon and the other functions controlled by the right little finger. Touch typists will recognize that this corresponds to the home row of a QWERTY keyboard. In one embodiment, when the user has their fingers on this home row, the spacebar 1030 is provided in a position to be actuatable by a user's thumb. In one embodiment, the three lobes of housing 1012 may be hinged together to collapse into a more compact form. While the above description describes mapping for the QWERTY keyboard, mappings for other keyboard arrangements are within the scope and contemplation of the invention.

Figure 10B:
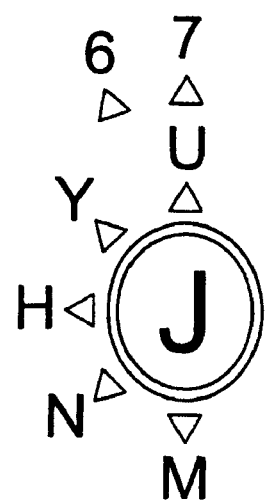

FIG. 10b is the mapping for the J key corresponding to button 1010 in FIG. 10a. As shown, actuating the button with downward pressure at its home position operates as a J select. Moving the button towards six o'clock prior to actuation selects an M; toward seven o'clock N; towards nine o'clock H; towards eleven o'clock Y; towards twelve o'clock U; further towards twelve o'clock "7", with eleven o'clock from the U selecting a "6". From this mapping, one of ordinary skill in the art will understand how the remaining buttons in FIG. 10a may be mapped to a QWERTY keyboard. Give the relatively small number of functions associated with each button, the appropriate sensor to use could be either a switch array or any of the other sensing embodiments discussed above. Tactile responses may be provided to provide a user an indication that, for example, they have moved far enough towards 12 o'clock to pass the "U" and get into the "7" zone.

It should be noted that features shown or described with reference to one embodiment may be applicable to another embodiment even when not explicitly called out and such is within the scope and contemplation of the invention. In the foregoing specification, the invention has been described with reference to specific embodiments thereof. It will be further evident that various modifications and changes can be made thereto without departing from the broader spirit and scope of the invention as set forth in the appended claims. The specification and drawings are, accordingly, to be regarded in an illustrative rather than a restrictive sense.

The invention claimed is:
1. A touch-type keyboard comprising:
a first and second array of physical keys, each physical key mapped to multiple functions wherein the first and the second array together are mapped to an entire alphabet; and the first array and the second array disposed on first and second lobes respectively, the first and second lobes coupled together and in a deployed configuration defining an angle there between; and a third lobe coupled to the first and second lobes and providing a spacebar function accessible by either hand during touch-typing wherein the third lobe occupies an area of a work surface that is at least 25% of the area occupied by the either of the first or second lobes.

2. The keyboard of claim 1 further comprising an input to accept absolute or relative motion information.

3. The keyboard of claim 1 having a deployed orientation and a collapsed orientation, the collapsed orientation resulting in a more compact form.

4. The keyboard of claim 1 wherein all functions mapped to a single physical key are associated with a same single finger used for such function on a touch-type typewriter keyboard and wherein each function is uniquely identified by the activation of the key.

5. The keyboard of claim 1 wherein the entire alphabet is mapped to exactly eight key, four on each array.

6. A keyboard comprising:

a first and second array of physical keys;

the arrays having a spatial mapping consistent with a touch-type typewriter keyboard, the keyboard having a deployed orientation and a collapsed orientation, the collapsed orientation resulting in a more compact form; and wherein the keyboard comprises at least three lobes that are angularly disposed with respect to one another, when in the deployed orientation the first two lobes defined by the first and second arrays and a third lobe lobe occupying an area of a work surface that is at least 25% of the area occupied by the either of the first or second lobes and providing a spacebar function accessible by either hand during touch-typing.

7. The keyboard of claim 6 wherein exactly 8 keys mapped to an entire alphabet and each letter is uniquely determine by a user finger location when activating the key.

* * * * *

UNITED STATES PATENT AND TRADEMARK OFFICE
CERTIFICATE OF CORRECTION

PATENT NO. : 8,194,040 B2  
APPLICATION NO. : 12/014493  
DATED : June 5, 2012  
INVENTOR(S) : Mark S. Knighton Page 1 of 1

It is certified that error appears in the above-identified patent and that said Letters Patent is hereby corrected as shown below:

In the Claims, Column 9, Claim 5, line 20, please delete "key" and insert --keys--.

Column 10, Claim 6, line 11, please delete "lobe lobe" and insert --lobe--.

Column 10, Claim 7, line 17, please delete "determine" and insert --determined--.

Signed and Sealed this  
Second Day of April, 2013

Teresa Stanek Rea  
*Acting Director of the United States Patent and Trademark Office*